United States Patent [19]
Vollmer et al.

[11] Patent Number: 4,921,311
[45] Date of Patent: May 1, 1990

[54] TRAILER BRAKE VALVE FOR UTILITY VEHICLES

[75] Inventors: Otto Vollmer, Munich; Wolfgang Rauscher, Massenhausen, both of Fed. Rep. of Germany

[73] Assignee: Knorr-Bremse AG, Fed. Rep. of Germany

[21] Appl. No.: 182,704

[22] Filed: Apr. 18, 1988

[30] Foreign Application Priority Data

Apr. 16, 1987 [DE] Fed. Rep. of Germany ....... 3713138

[51] Int. Cl.$^5$ ............................................. B60T 15/12
[52] U.S. Cl. ........................................ 303/9.76; 303/7
[58] Field of Search .................... 303/7, 9.75, 9.76, 49

[56] References Cited

U.S. PATENT DOCUMENTS 4,239,293 12/1980 Page ................................. 303/9.76
4,397,505 8/1983 Linkner ......................... 303/9.76 X
4,407,548 10/1983 Graham ............................ 303/9.76

Primary Examiner—Duane A. Reger
Attorney, Agent, or Firm—Pollock, Vande Sande & Priddy

[57] ABSTRACT

In a brake valve for the operation of the service brake and spring-loaded brake installation of a utility vehicle trailer, a service brake valve (3) and a spring-loaded valve (1) are provided in a common housing (5) in mirror image arrangement. The two valves, operating in a manner known per se, are constructed of identical components and a common ventilation in the form of a ventilation insert (47) in the center of the housing (5). The two valves are fed either from a common reservoir (55) or from separate reservoirs (77, 79) provided for each of the valves, which reservoirs can be refilled through overflow valves (81, 83) without reflux from the line of the trailer holding reserve air.

4 Claims, 3 Drawing Sheets

TRAILER BRAKE VALVE FOR UTILITY VEHICLES

FIELD OF THE INVENTION

The invention relates to a trailer brake valve for utility vehicles for the controlled compressed air supply to a service brake and spring-loaded brake installation.

BACKGROUND OF THE INVENTION

Trailer brake valves in two-line brake installations serve for the regulation of the trailer brake. Trailer brake installations may have, in the same manner as pulling vehicles, a service brake as well as a spring-loaded brake, which may be housed in a common actuating element, the so-called double-brake cylinder.

SUMMARY OF THE INVENTION

Based on the foregoing, the object of the invention is to construct a trailer brake valve in an economical and constructionally simple manner in such a way that it can be used for combined actuation, i.e., for actuation of the service brake cylinder as well as for the controlled actuation of the spring-loaded brake cylinder. It should also be possible to take into account the safety standards prescribed for the particular brake installation, without impairing the characteristic of the simple design of the valve construction.

Due to the mirror image arrangement of the individual valves, i.e., the service brake valve and the spring-loaded valve, the trailer brake valve has the simplest possible construction. The valve components of the two valves can be composed of identical elements, a common ventilation valve in the form of a ventilation insert in the center of a common housing being assigned to the two valves. In addition, the housing holding the two valves can itself consist of two identical housing halves, in such a manner that, for example, the service brake valve could be used, after removal of the spring-loaded valve, as a separate relay valve. The service brake valve as well as the spring-loaded valve can be fed from a common reservoir, but it is also possible to have separate reservoirs for the individual valves. With such an arrangement it is possible to assign to each of the two reservoirs an overflow valve without reflux, if elevated safety standards apply to the combined brake installation. It is possible to mount a two-way valve between the energy discharges of the trailer double-valve consisting of the two individual valves and the so-called double-brake cylinder of the trailer in order to attain an incremental prevention.

BRIEF DESCRIPTION OF THE DRAWINGS

In order that the invenion may be more clearly understood, reference will now be made to the accompanying drawings, in which several embodiments of the invention are shown for purposes of illustration, and in which.

DESCRIPTION OF PREFERRED EMBODIMENTS

Figure 2:
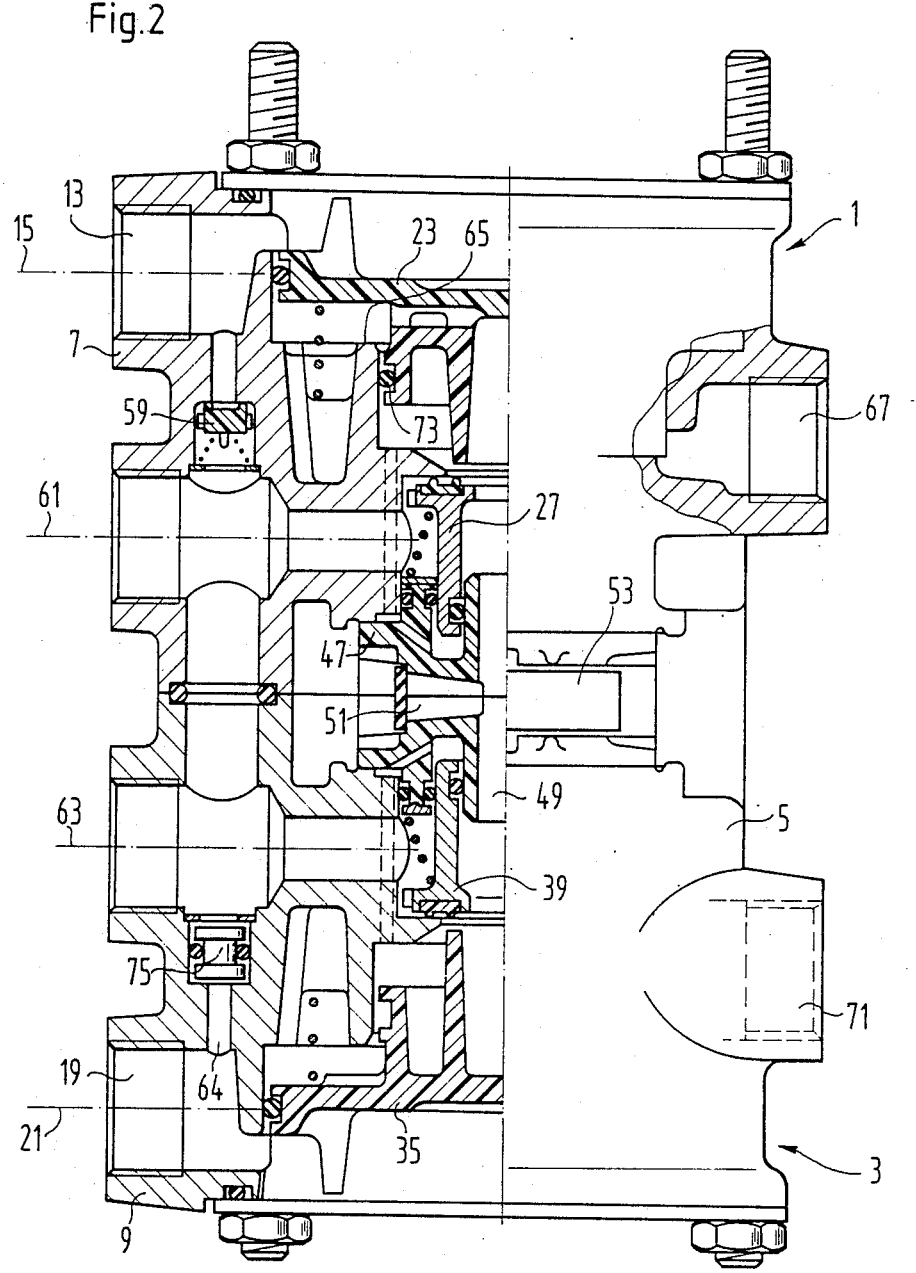
FIG. 2 is a partial cross section view of the trailer brake valve.

The trailer combination valve according to the invention consists of a spring-loaded valve 1 and a service brake valve 3, arranged in a common housing 5. The partial cross section view in FIG. 2 shows that the housing 5 consists of two identical housing halves 7 and 9, in which the spring-loaded valve and the service brake valve are housed. A so-called double-brake cylinder 11 of actually known construction is assigned within the trailer to the trailer combination valve of the above described design. The double-brake cylinder 11 consists of a service brake cylinder, which can be actuated by the service brake valve 3, and of a spring-loaded brake cylinder, which can be actuated by the spring-loaded brake valve 1.

The housing 5 is connected through a connector 13 to a line 15 with reserve compressed air, whereby it is possible to arrange an overflow valve 17 with reflux in the line 15. Another connection 19 is provided on the lower end (as shown) of the housing 5, this connection being to the brake control line 21. Both line 15, holding reserve compressed air, and brake control line 21, are coupled to the corresponding lines of the pulling vehicle in a manner known per se.

Figure 1:
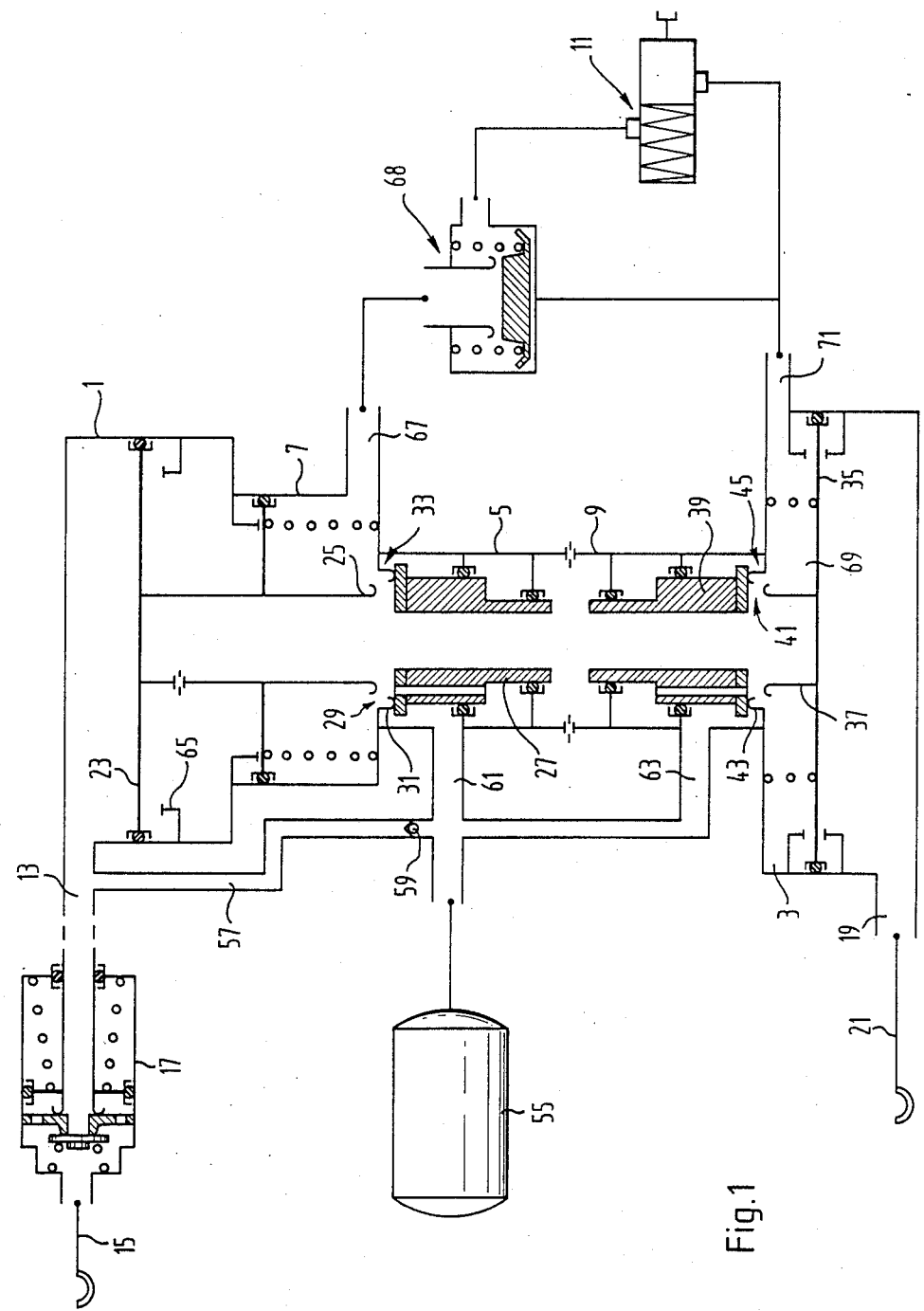
FIG. 1 is a schematic view of the trailer brake valve according to the invention.

The valve elements arranged in housing 5 are of known construction and function, so that this description will be limited to some essential components. The spring-loaded brake valve 1 has a stepped piston 23, on which an extension 25, together with a valve body 27, forms a discharge 29. A valve seat 31 fixed on the housing side, together with the valve body 27, forms an inlet 33. In a corresponding manner, a piston 35, an extension 37 of the control piston, a valve body 39, a discharge 41, a valve seat 43 and an inlet 45 have been assigned to the service brake valve 3. Arranged in the center of the housing is a ventilation insert 47, common to and serving for the ventilation of both valves, whereby the air is released to the atmosphere through a central channel 49 and a chamber 51 after passing a rubber band 53 constructed as reflux valve. FIG. 1 shows that a compressed air container 55 is connected to line 15, whereby a reflux valve 59 (see also FIG. 2) can be arranged in the connecting line 57. From the compressed air container 55 lines 61 and 63 lead to the inlet and discharge valves of the two valve arrangements in housing 5.

The operation of the trailer combination valve is as follows:

In drive position with coupled trailer, the maximum operating pressure of the pulling vehicle is on the connection 13. The stepped piston 23 is in contact with stop 65. The discharge 29 is closed and the inlet 33 is open, whereby the spring-load of the double-brake cylinder 11 is in contact with the compressed air container 55 through line 61. The spring load of the double-brake cylinder is aerated, i.e., the parking brake is released.

With a pressure drop at connection 13, be it voluntary through a valve or upon decoupling, or due to the appearance of a leak in the supply line, the stepped piston 23 remains first in its lower stopped position. Only at a preset pressure on connection 13 of, e.g., 4 bar, the stepped piston 23 moves (dependent on the effective surface) upwards, i.e., the inlet 33 closes and the discharge 29 opens. The spring load of the double-brake cylinder is aerated, whereby the air is vented to atmosphere through the open discharge 29 and the ventilation insert 47 shown in FIG. 2. The spring load of the double-brake cylinder is consequently vented, i.e., the double-brake cylinder brakes. In the connection between the connection 67 and the double-brake cylinder 11 it is possible to provide a two-way valve 68, which prevents an addition of the actuation from the spring-loaded valve and the service brake valve.

The service brake valve 3 is actuated in a known manner by compressed air from the brake control line 21. If the piston 35 is loaded with compressed air through a valve device (not shown) by means of the brake control line 21, it moves upward (as shown) in the drawing) in a manner known per se. Air from the compressed air container 55 reaches the chamber 69 through line 63 and the open inlet, and from there through discharge 71 and the shown connecting line it reaches the service brake part of the double-brake cylinder 11, i.e., the service brake is operated in a controlled manner whereby simultaneously the spring control of the double-brake cylinder is ventilated, and thus, the emergency brake of the double-brake is cylinder released. The pressure thus created through line 73 locks the two-way valve 68 in the sense that compressed air from connection 71 cannot pass the two-way valve 68.

FIG. 2 shows how the above-mentioned valve components of identical design are arranged in a mirror image manner in housing 5. Thus it is possible, e.g., to provide the stepped piston 23 of the spring-loaded valve 1 as simple piston 35 of the service brake valve, in spite of its stepped configuration, as in this alternative the seal 73 assigned to the stepped piston 23 is omitted. The connecting line 57 of the spring-loaded valve 1, containing the reflux valve 59, is designed accordingly in the lower housing half 9, the branch line 64 being sealed by a sealing element 75. The service brake valve 3, which, as shown in the drawing, is provided in the lower housing half 9, can also be used in an insulated manner as a relay valve; for this purpose a closing lid on top simply needs to be added. The overflow valve 17 with reflux has been shown and explained above as being located between the coupling head and the housing 5; the overflow valve can also be screwed into the connection 13. The lines 57, 61 and 63 can also be constructively integrated in housing 5 in a mirror image arrangement, although the embodiment shown in FIG. 2 with selectively usable connections for lines 61 and 63 has been described as preferred.

Figure 3:
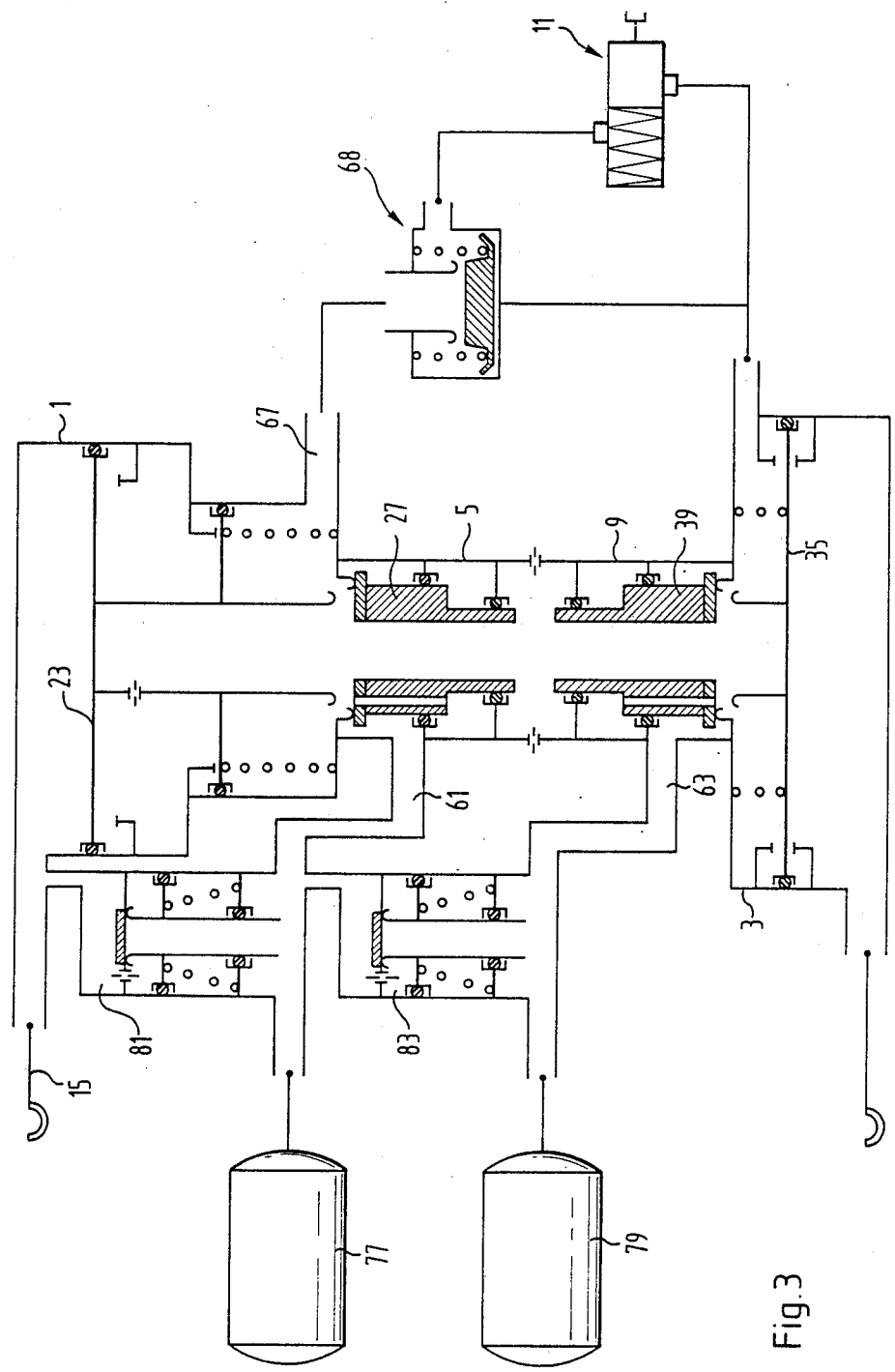
FIG. 3 is a view, comparable to FIG. 1, of the trailer brake valve in another embodiment.

In another embodiment according to the invention, shown in FIG. 3, the trailer combination valve is provided with two reservoirs 77 and 79, the reservoir 77 being designated for the spring-loaded valve 1 and reservoir 79 feeds the service brake valve 3. An overflow valve is assigned to each of the two reservoirs, the overflow valve 81 assigned to reservoir 77 opening, e.g., at a pressure of 3.8 bar, while the overflow valve 83, assigned to reservoir 79, opens at a pressure of, e.g., 4 bar. The two overflow valves are provided, according to the requirements of, for example, a higher safety standard, without reflux. The operation of the trailer combination valve according to FIG. 3 corresponds to that of the above described construction. In principle it is possible to constructively assign the two overflow valves 81 and 83 to the housing 5 of the combination valve, whereby they can be, e.g., screwed into the respective connections. A two-way-valve 68 is also provided in the embodiment according to FIG. 3.

What is claimed is:

1. In a utility vehicle trailer comprising a service brake and a spring-loaded brake installation including a service brake valve and a spring-loaded valve contained in a common housing and having outlets connected to a combined service brake/spring-loaded brake double-brake cylinder, a brake valve for providing a controlled compressed air supply, the improvement wherein said service brake valve and said spring-loaded valve have identical components and are arranged in said common housing in a mirror image configuration, and wherein said housing consists of two identical housing halves, a common ventilator insert being provided in a center of said housing for the ventilation of both said service brake valve and said spring-loaded valve.

2. The improvement according to claim 1, wherein said service brake valve and said spring-loaded valve are supplied from a common reservoir (55) adapted to be refilled through a reflux valve (59) from a line (15) holding reserve air.

3. The improvement according to claim 1, comprising a first reservoir (77) associated with said spring-loaded valve (1), and adapted to be refilled from a reserve air holding line (15) through a first overflow valve (81) without reflux, and a second reservoir (79) mounted downstream of said first reservoir (77) and connected to said first reservoir for the service brake valve (3), a second overflow valve (83) without reflux being located between said first and second reservoirs (77, 79), the opening pressure of said second overflow valve (83) being higher than that of said first overflow valve (81) of the spring-loaded valve (1).

4. The improvement according to claim 1, comprising a two-way valve between energy discharges of said housing (5) and said double-brake cylinder (11).

* * * * *